(12) United States Patent
Wu et al.

(10) Patent No.: US 10,018,849 B2
(45) Date of Patent: Jul. 10, 2018

(54) ONE-WAY VISION WINDOW SYSTEM (71) Applicant: BenQ Materials Corporation, Taoyuan (TW)

(72) Inventors: Lung-Hai Wu, Taoyuan (TW); Fung-Hsu Wu, Taoyuan (TW)

(73) Assignee: BenQ Materials Corporation, Taoyuan (TW)

( * ) Notice: Subject to any disclaimer, the term of this patent is extended or adjusted under 35 U.S.C. 154(b) by 442 days.

(21) Appl. No.: 14/994,158

(22) Filed: Jan. 13, 2016

(65) Prior Publication Data

US 2016/0209682 A1    Jul. 21, 2016

Related U.S. Application Data (63) Continuation-in-part of application No. 14/923,415, filed on Oct. 26, 2015, now Pat. No. 9,970,631.

(30) Foreign Application Priority Data

Jan. 20, 2015  (TW) .............................. 104101804 A
Dec. 8, 2015   (TW) .............................. 104141115 A (51) Int. Cl.
| | | |
|---|---|---|
| *F02F 1/10* | (2006.01) | |
| *G02B 27/14* | (2006.01) | |
| *G02B 26/02* | (2006.01) | |
| *G02F 1/1334* | (2006.01) | |

(52) U.S. Cl.
CPC ........... *G02B 27/144* (2013.01); *G02B 26/02* (2013.01); *G02F 1/1334* (2013.01)

(58) Field of Classification Search
CPC ...... G02B 26/02; G02B 27/144; G02F 1/1334
USPC .............................................................. 349/1
See application file for complete search history.

(56) References Cited

U.S. PATENT DOCUMENTS

| | | | | |
|---|---|---|---|---|
| 6,133,894 A | * | 10/2000 | Yagyu .................... | G02F 1/135 345/87 |
| 2010/0085375 A1 | * | 4/2010 | Chung ................. | G09G 3/3406 345/589 |
| 2012/0293572 A1 | * | 11/2012 | Akimoto .............. | G09G 3/2022 345/691 |
| 2015/0205149 A1 | | 7/2015 | Kida et al. | |

FOREIGN PATENT DOCUMENTS

| | | | |
|---|---|---|---|
| JP | 2007225849 A | * | 9/2007 |
| JP | 2014021375 A | | 2/2014 |
| TW | 236681 B | | 12/1994 |
| TW | 201040596 A | | 11/2010 |
| TW | 201144858 A | | 12/2011 |
| WO | 2014051002 A1 | | 4/2014 |

* cited by examiner

*Primary Examiner* — Hoan C Nguyen
(74) *Attorney, Agent, or Firm* — CKC & Partners Co., Ltd.

(57) ABSTRACT

A one-way vision system includes a light valve device, a first illumination device, and a control module electrically connected to the light valve device and the first regulating module of the first illumination device for synchronously controlling switching frequency and time sequence of the light valve device and the first illumination device. Therefore, the one-way vision window system provides well anti-peeping effect without interfering from the external light of the present system.

12 Claims, 6 Drawing Sheets

ONE-WAY VISION WINDOW SYSTEM

RELATED APPLICATIONS

The present application is a continuation-in-part application of U.S. application Ser. No. 14/923,415, filed on Oct. 26, 2015, which claims priority to Taiwanese Application Serial Number 104101804, filed on Jan. 20, 2015. Also, the present application claims priority to Taiwanese Application Serial Number 104141115, filed on Dec. 8, 2015. The entire disclosure of the above applications are hereby incorporated by reference herein.

BACKGROUND OF THE INVENTION

Field of the invention

The invention relates to a one-way vision window system.

Description of the Related Art

Conventional one-way vision devices usually include a semi-transparent metal film structure or an opaque film structure containing a plurality of apertures. Actually, the principle of one-way vision effect is that the light transmittance and light reflectance on the two sides of the conventional one-way vision devices are inconsistent by the above structures; therefore, it is not easy to see the scenes of the side which light reflectance is less than light transmittance from the other side which light reflectance is higher than light transmittance; however, with the change of light intensity ratio of the environment of the two sides of the one-way vision devices, the one-way vision effect may be declined or disappeared. For example, when in a building having a window with the conventional one-way vision devices, the outdoors lighting is generally much lower than the indoor lighting in the evening, even if the outside windows has the conventional one-way vision device with higher light reflectance, there is no interference caused by the reflection of outdoor lighting; therefore, the brighter indoor scenes can still be seen at the outdoors, and the indoor people's privacy will be affected. Therefore, the conventional one-way vision device cannot be applicable in such a situation; additional shelters, such as curtains and louvers, are used probably, but both indoor and outdoor scenes are unable to be seen accordingly.

Furthermore, in another application of the conventional one-way vision devices, such as animal exhibition halls of zoos, the animal exhibition halls usually use a transparent glass window with the conventional one-way vision devices to divide into two independent enclosed spaces with an animal side and a visitor side, When light intensity of the animal side is higher than the visitor side, the animals will not be disturbed by actions of visitors or scenes of the visitor side. Therefore, the visitors can observe the animals, and the animals won't be frightened due to seeing the crowd. Accordingly, the light intensity of the visitor side needs to maintain at an intension level below the animal side as far as possible. It may cause inconvenience and safety concerns due to insufficient light. Especially in the animal exhibition hall of nocturnal animals, the animal side maintains weak lighting, and the visitor side has to maintain nearly no external light source. It causes public inconvenience and safety concerns.

As the result, it still exists a need to provide a one-way vision window system with better anti-peeping effect. For the situation that the environment of the two sides of the light valve device has a large difference of light intensity ratio, the brighter side of the light valve device still can't be seen from the other darker side, but the scenes of the other darker side can be seen. In another situation, one or more connected enclosed spaces with a one-way vision window system therebetween are provided, for example in animal exhibition hall, the one-way vision effect of the one-way vision window system is selectively set to make the visitor side under sufficient light with a see-through effect respective to the brighter or darker animal side, so that the visitors can safely observe the animals without disturbing the animals.

SUMMARY OF THE INVENTION

In an aspect of the present invention, a one-way vision window system includes a light valve device, a first illumination device and a control module. The light valve device is for controlling light penetration of each side of the light valve device. The first illumination device is disposed on a side of the light valve device and includes a first light source and a first regulating module for regulating the first illumination device. The control module is connected to the light valve device and the first regulating module of the first illumination device for synchronously controlling switching frequency and time sequence of the light valve device and the first illumination device. The switching frequency is in a range of 60 Hz to 1000 Hz, and when the first illumination device turns on, the light valve device is in an opaque state; when the first illumination device turns off, the light valve device is in a transparent state.

In a preferred embodiment of the one-way vision window system of the present invention, the one-way vision window system is applied for an enclosed space, which the light valve device is disposed on one sidewall of the enclosed space, and external light can transmit through it to the enclosed space; and the first illumination device is disposed in the enclosed space.

In another preferred embodiment of the one-way vision window system of the present invention, the enclosed space includes, but not limited to, buildings, vehicles or exhibition cabinet.

In another preferred embodiment of the one-way vision window system of the present invention, the light valve device is a polymer-dispersed liquid crystal device, a reverse mode polymer-dispersed liquid crystal device, a liquid crystal device (LCD) panel, a polarizing dimming device or a refractive dimming device.

In another preferred embodiment of the one-way vision window system of the present invention, the first light source of the first illumination device is artificial light or natural light.

In another preferred embodiment of the one-way vision window system of the present invention, the artificial light includes light-emitting diode (LED), organic light emitting diode (OLED), incandescent, fluorescent, cold cathode lamps, gas discharge lamps, fire type lamps or a combination thereof.

In another preferred embodiment of the one-way vision window system of the present invention, the first regulating module of the first illumination device includes an electronic adjustable module or a shutter interrupter module.

In another preferred embodiment of the one-way vision window system of the present invention, the shutter interrupter module includes a mechanical shutter or an electronic shutter.

In another preferred embodiment of the one-way vision window system of the present invention, the control module is connected to the first regulating module of the first illumination device and the light valve device by wired communication, wireless communication or power line communication.

In another aspect of the one-way vision window system of the present invention the one-way vision window system further includes a semi transflective layer disposed on a surface of the light valve device opposite to the side with respect to the first illumination device.

In a preferred embodiment of the one-way vision window system of the present invention, the semi transflective layer is a metal thin-film layer, a glass bead layer or a high reflective porous layer.

In further another aspect of the one-way vision window system of the present invention, the one-way vision window system further includes a second illumination device disposed on a side of the light valve device opposite to the side with respect to the first illumination device. The second illumination device includes a second light source and a second regulating module for regulating the second illumination device and connected to the control module for synchronously controlling switching frequency and time sequence of the light valve device, the first illumination device and the second illumination device.

Accordingly, the one-way vision window system of the present invention improves the one-way vision effect of the conventional one-way vision devices, which will be declined or disappeared in the evening due to the darkening natural light. The one-way vision window system of the present invention provides well anti-peeping effect without interfering from the external light of the present system.

BRIEF DESCRIPTION OF THE DRAWINGS

The above and other aspects of the invention will become better understood with regard to the following detailed description of the preferred but non-limiting embodiment(s). The following description is made with reference to the accompanying drawings.

DETAILED DESCRIPTION OF THE INVENTION

Please note the drawings shown in the Figures are for illustrative purposes only and not to scale.

Figure 1:
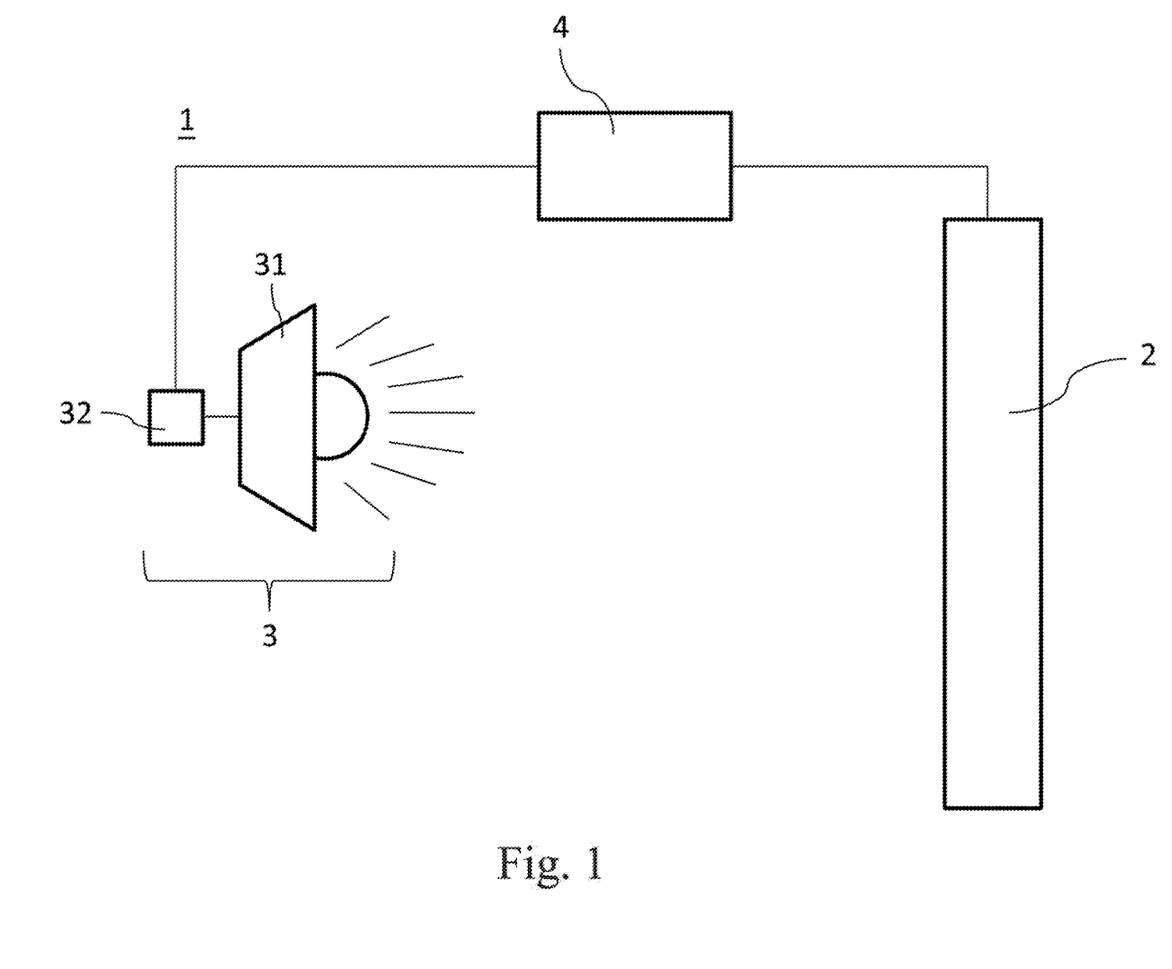
FIG. 1 shows the perspective views of the one-way vision window system of a preferred exemplary aspect of the present invention.

Referring to FIG. 1, in an aspect of the present invention, a one-way vision window system 1 includes a light valve device 2, a first illumination device 3 and a control module 4. The light valve device 2 is for controlling light penetration of two sides of the light valve devices. The first illumination device 3 is disposed on a side of the light valve device 2, and includes a first light source 31 and a first regulating module 32 for regulating the first illumination device 3. The control module 4 is connected to the light valve device 2 and the first regulating module 32 of the first illumination device 3, and synchronously controls the switching frequency and time sequence of the light valve device 2 and the first illumination device 3. The switching frequency is in a range of 60 Hz to 1000 Hz. Furthermore, when the first illumination device 3 turns on, the light valve device 2 is in an opaque state; when the first illumination device 3 turns off, the light valve device 2 is in a transparent state.

In a preferred embodiment of the one-way vision window system of the present invention, the one-way vision window system 1 is applied for an enclosed space, which at least one light valve device 2 is disposed on one sidewall of the enclosed space, and external light can transmit to the enclosed space. At least one first illumination device 3 is disposed in the enclosed space. The enclosed space, for example, may be a building. The one-way vision window system 1 allows indoors of the building with brighter light environment having a good privacy to the darker outdoors. The enclosed space can also be an enclosed space with respect to the external environment, such as transportation vehicles, for example, aircrafts, ships, trains, automobiles, or independent individual cabins, passenger compartments of the transportation vehicles. Therefore, the transportation vehicles itself, the cabins or the passenger compartments can have a good privacy with respect to external environment or to each other. The enclosed space can also be an exhibition cabinet or an exhibition room, so that the creatures therein can be watched and monitored without interfering from the external light and the observers.

In another preferred embodiment of the one-way vision window system of the present invention, the light valve device 2 is a polymer-dispersed liquid crystal device, a reverse mode polymer-dispersed liquid crystal device, a LCD panel, a polarizing dimming device or a refractive dimming device.

In further a preferred embodiment of the one-way vision window system of the present invention, the first light source 31 of the first illumination device 3 is artificial light or natural light.

In another preferred embodiment of the one-way vision window system of the present invention, the artificial light includes light-emitting diode (LED), organic light emitting diode (OLED), incandescent, fluorescent, cold cathode lamps, gas discharge lamps, fire type lamps or a combination thereof.

In another preferred embodiment of the one-way vision window system of the present invention, the first regulating module 32 of the first illumination device 3 can include an electronic adjustable module or a shutter interrupter module. The light source is one with very short driving time, such as LED or OLEO, the light source can be adjustable with voltage or current by the electronic adjustable module to achieve fast switching effect. Hence, if the light source is natural light or an artificial light with long driving time, the light source cannot or hard to achieve fast switching effect, the light source can apply a shutter interrupter module in the emitted direction of the first light source 31, so that the first light source 31 of the first illumination device 3 can be a controlled light source with adjustable switching frequency.

In another preferred embodiment of the one-way vision window system of the present invention, the shutter interrupter module includes a mechanical shutter or an electronic shutter.

In another preferred embodiment of the one-way vision window system of the present invention, the control module 4 can be connected to the first regulating module 32 of the first illumination device 3 and the light valve devices 2 by wired communication, wireless communication or power line communication. For example, the frequency and time sequence of one or more groups of light valve device and first illumination device may be synchronously controlled by wired or wireless network transmission, or connected by power line communication of the existing power loop of the building to simplify the setup procedure of the one-way vision window system of the present invention.

Figure 2A:
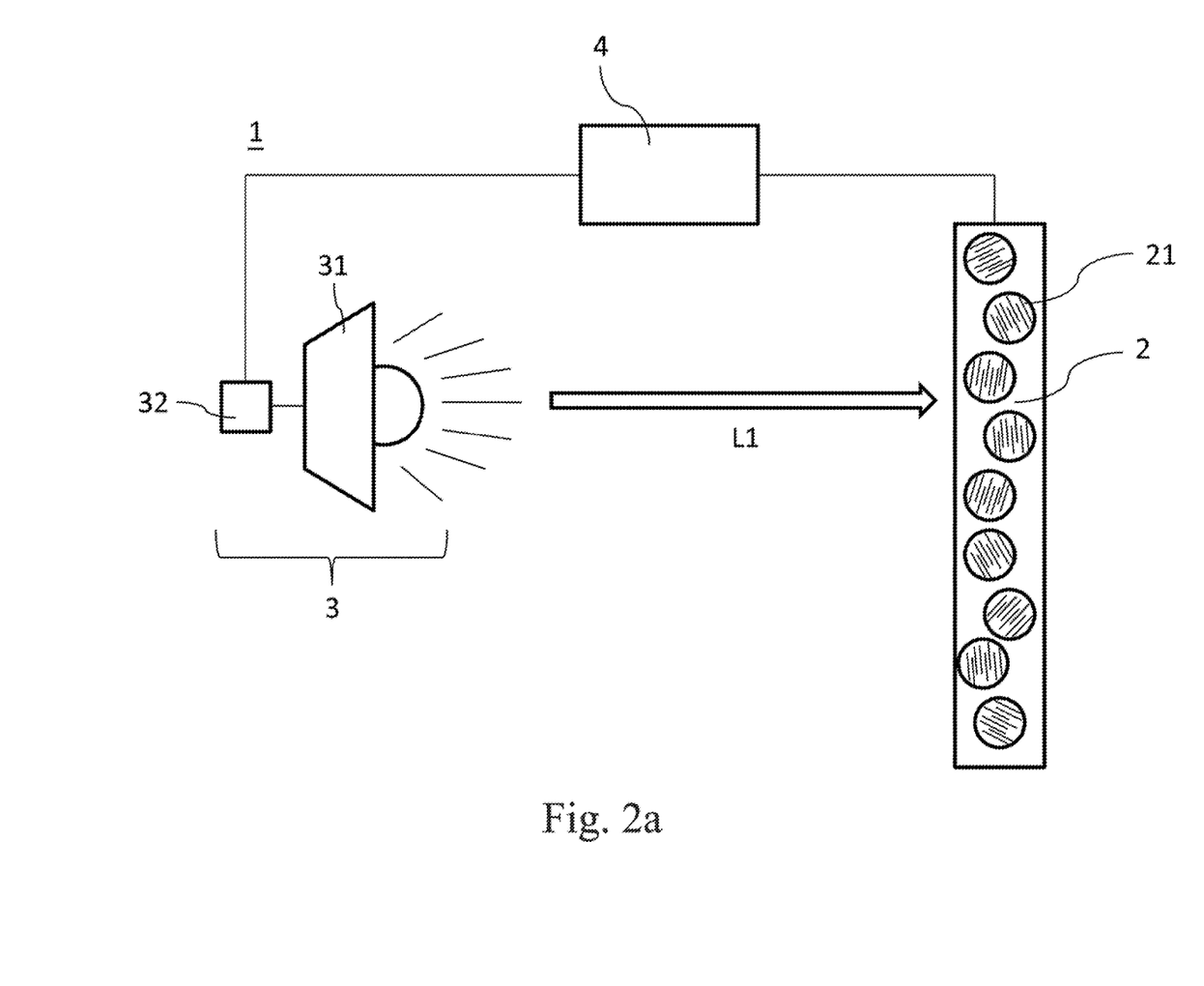
FIG. 2a and FIG. 2b illustrate the principle of the one-way vision window system of a preferred exemplary embodiment of the present invention.
Figure 2B:
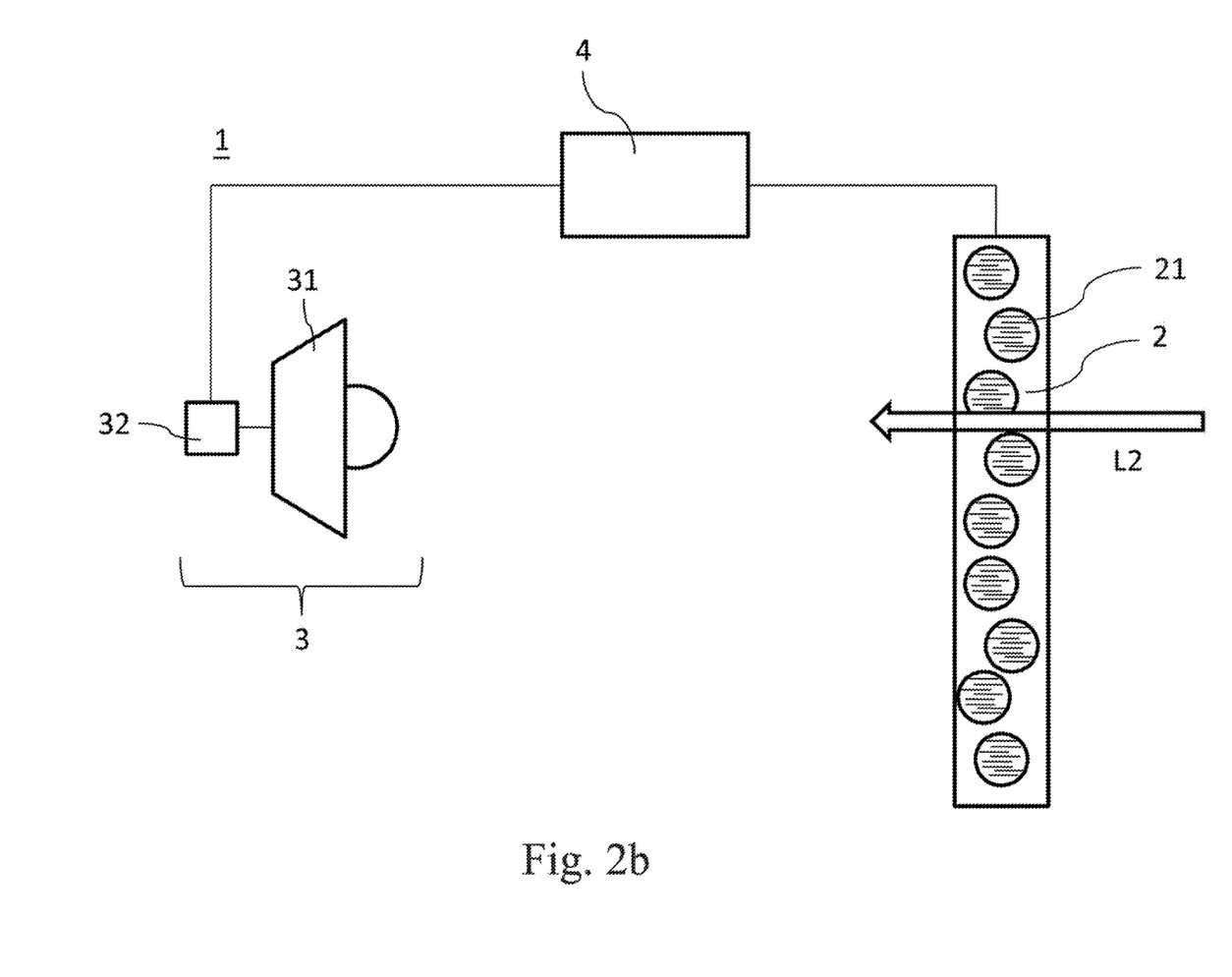
Figure 3:
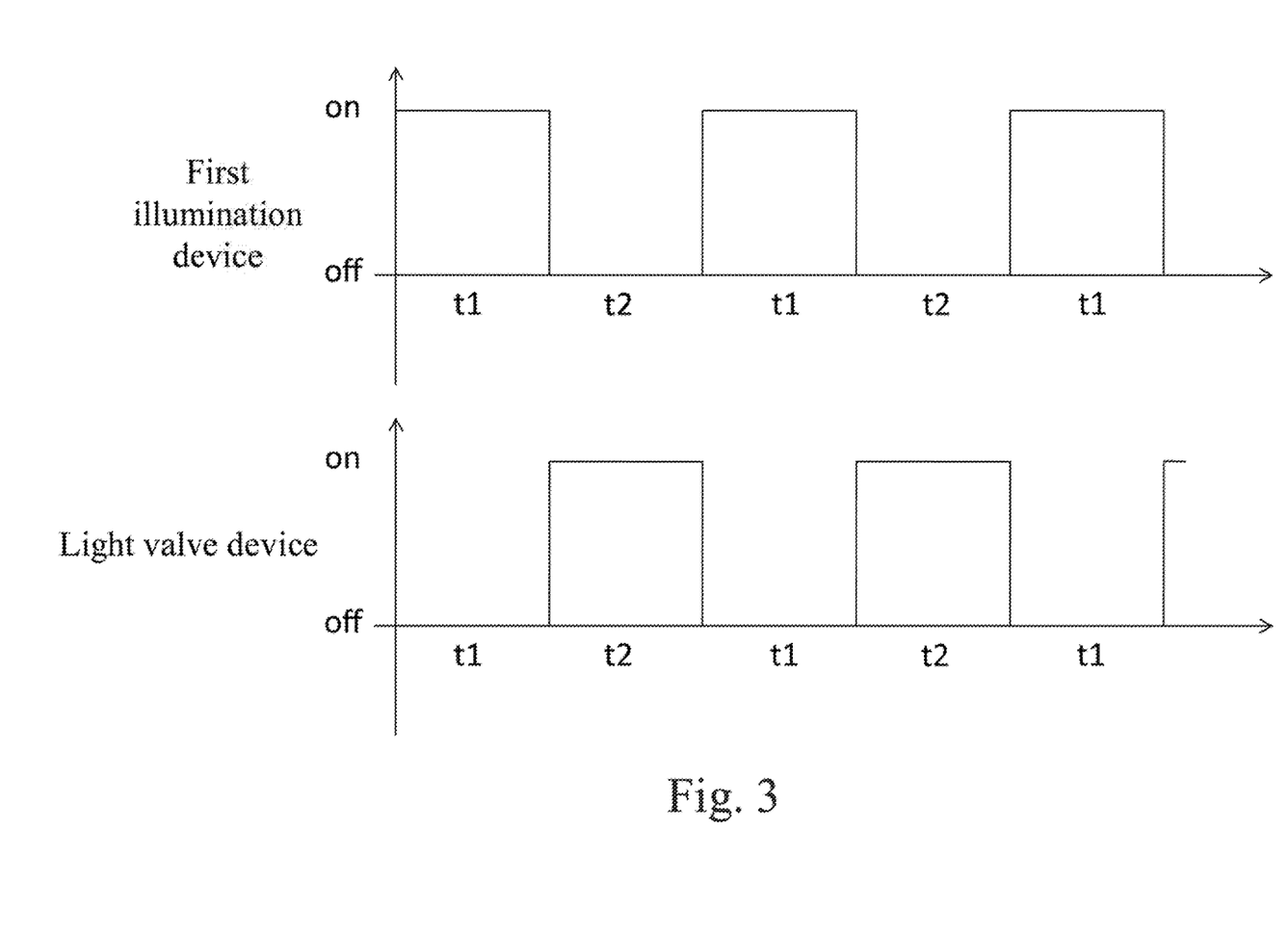
FIG. 3 shows the time sequence diagram of the first illumination device and the control module of the one-way vision window system of a preferred exemplary embodiment of the present invention.

Referring to FIG. 2a and FIG. 2b, FIG. 2a and FIG. 2b illustrate the principle of the one-way vision window system of the present invention. The light valve device 2 is a polymer-dispersed liquid crystal which is in transparent state when power is supplied, with very short response time, which the maximum switching frequency of transparent state and opaque state is up to 1000 Hz. The first light source 31 of the first illumination device 3 is a LED, The first regulating module 32 of the first illumination device is for fast switching the first illumination device 3. Now referring to FIG. 3, FIG. 3 shows the time sequence diagram of the first illumination device 3 and the control module 4 of the one-way vision window system 1. When the one-way vision window system is at the time point t1, the first illumination device 3 turns on; the light valve device 2 is unpowered; the liquid crystal micelle 21 is in a scattered state of irregular arrangement, and the light L1 from the first illumination device 3 only can illuminate the side thereof, but cannot pass through the light valve device 2, and the light valve device 2 presents an opaque state, Therefore, even in the situation of that the side of the first illumination device 3 is brighter than the other side of the light valve device 2 with respect to the first illumination device 3, the scenes of the side of the first illumination device 3 still cannot be seen from the other side. When at the time point t2; the first illumination device 3 turns off; the light valve device 2 is powered, the liquid crystal micelle 21 is in a transparent state of regular arrangement. The first illumination device 3 does not emit any light. Even if there is only rare light L2 emitted from the other side of the light valve device 2 with respect to the first illumination device 3, the light L2 can still pass through the light valve device 2 into the side of the first illumination device 3, so that persons at the side of the first illumination device 3 can still watch the scenes of the other side. Further, because the human eyes have an effect of persistence of vision, quickly switching the time point t1 and t2 by using the control module 4, which the switching frequency is greater 60 Hz, can make that the persons on the side of the first illumination device 3 feel like that the scenes of the other side of the light valve device 2 with respect to the first illumination device 3 can be seen by the persons, and the scenes of the side of the first illumination device 3 cannot be seen by persons on the other side of the light valve device 2 with respect to the first illumination device 3 simultaneously.

Figure 4:
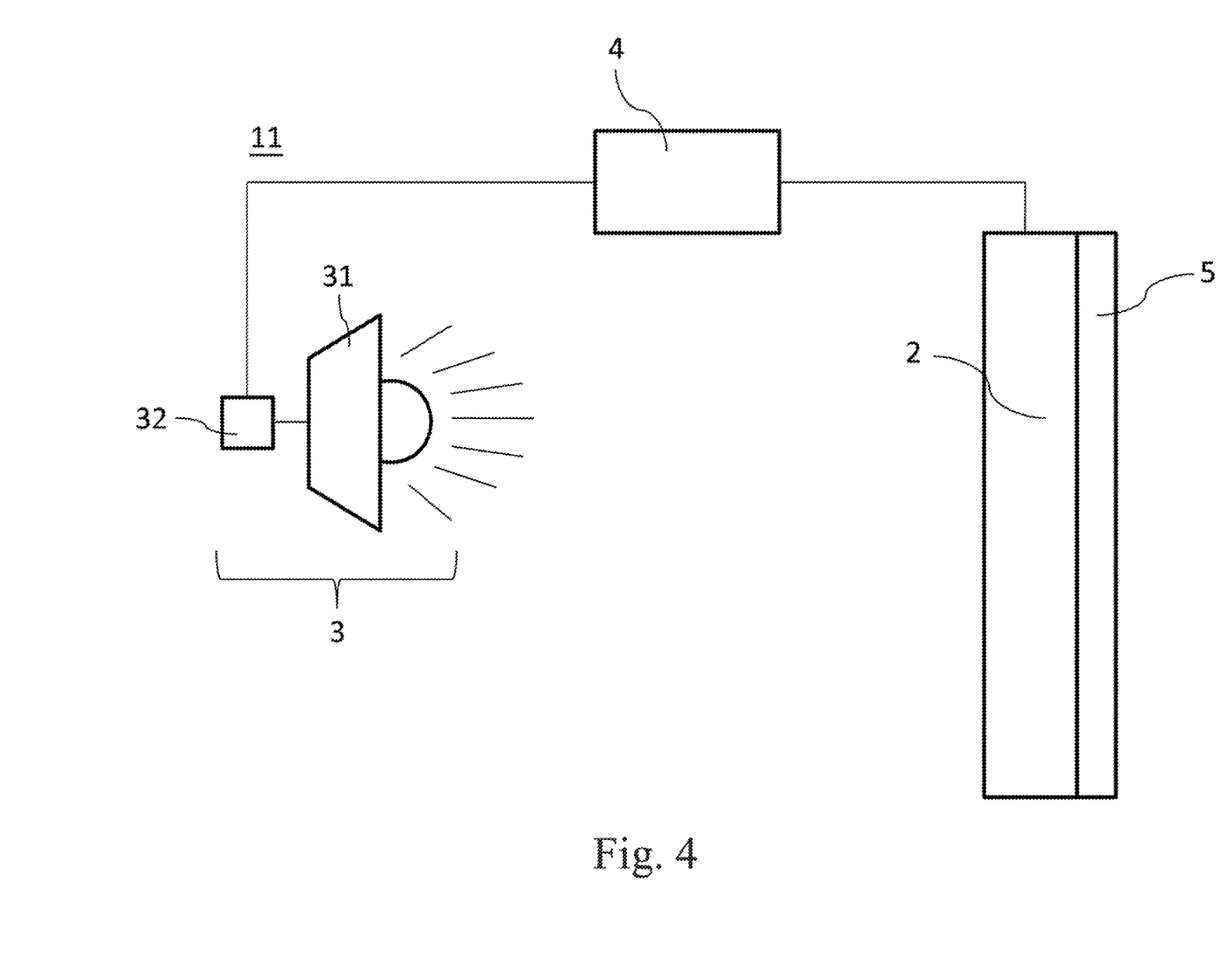
FIG. 4 shows the perspective views of the one-way vision window system of another preferred exemplary aspect of the present invention.

Referring to FIG. 4, in another aspect of the one-way vision window system 11 of the present invention, the one-way vision window system 11 further includes a semi transflective layer 5 disposed on the surface of the side of the light valve device 2 opposite to the side of the first illumination device 3. Therefore, when the light valve device 2 is switched to the transparent state in the daytime which the light intensity of the side of the semi transflective layer 5 is greater than the side of the first illumination device 3, the side of the first illumination device 3 still has a one-way vision effect.

In further another preferred embodiment of the one-way vision window system of the present invention, the semi transflective layer 5 is a metal thin-film layer, a glass bead layer or a high reflective porous layer. Therefore, when the light reflectance of the side of the semi transflective layer 5 is greater than the light transmittance thereof, the persons on the side of the semi transflective layer 5 cannot see the scenes of the side of the first illumination device 3.

Figure 5:
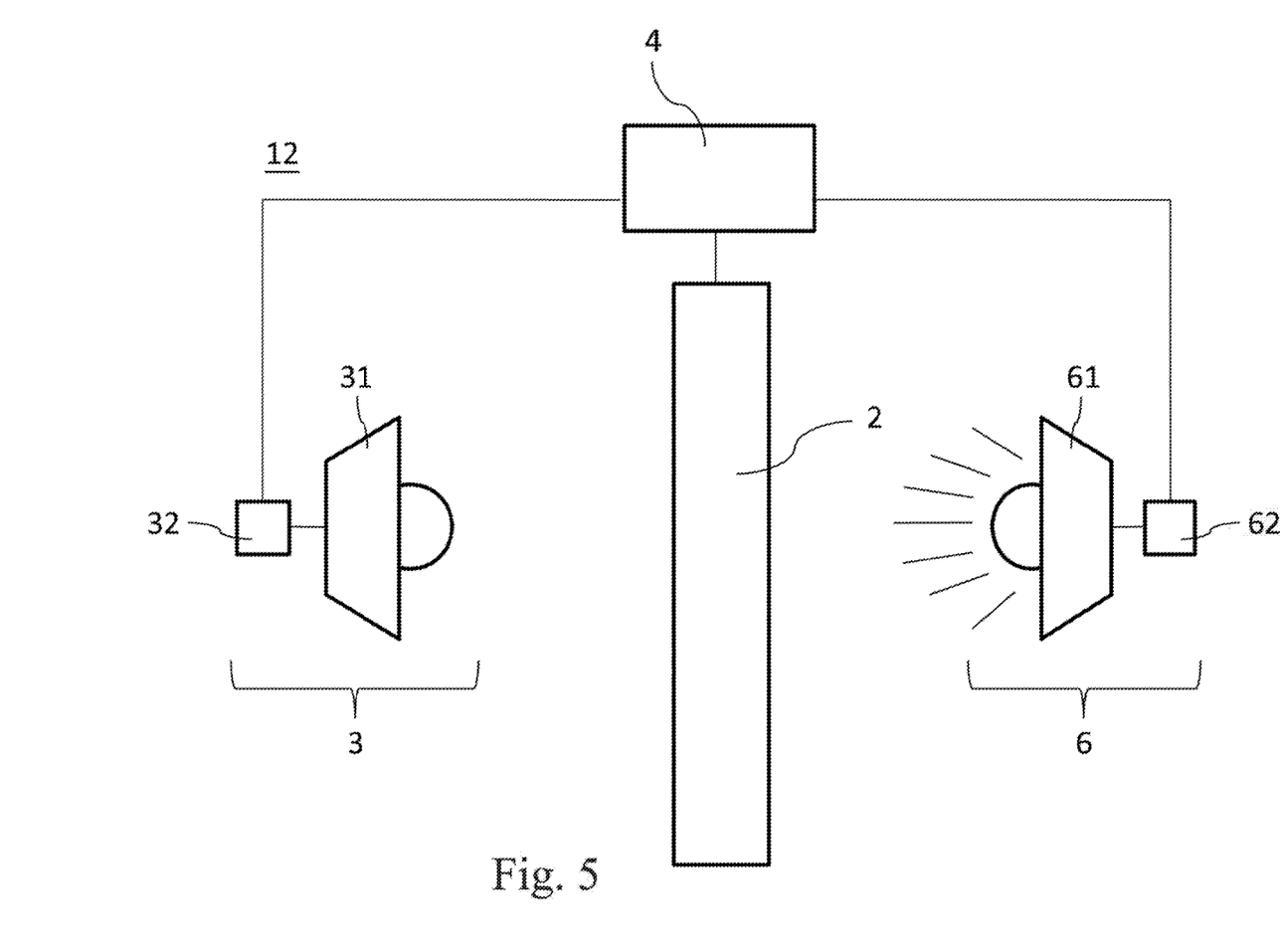
FIG. 5 shows the perspective views of the one-way vision window system of further another preferred exemplary aspect of the present invention.

Referring to FIG. 5, in further another aspect of the one-way vision window system 12 of the present invention, the one-way vision window system 12 further includes a second illumination device 6 disposed on a side of the light valve device 2 opposite to the first illumination device 3. The second illumination device 6 includes a second light source 61 and a second regulating module 62 for regulating the second illumination device 6 and connected to the control module 4 for synchronously controlling switching frequency and time sequence of the light valve device 2, the first illumination device 3 and the second illumination device 6. Therefore, with the control module 4 synchronously controlling the switching frequency and time sequence of the light valve device 2, the first illumination device 3 and the second illumination device 6, the one-way vision window system 12 can selectively have a one-way vision effect from the space with the first illumination device 3 to the space with the second illumination device 6 and vice versa.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:
1. A one-way vision system comprising:
a light valve device for controlling light penetration of each side of the light valve device;
a first illumination device disposed on a side of the light valve device, and comprising a first light source and a first regulating module for regulating the first illumination device; and
a control module connected to the light valve device and the first regulating module of the first illumination device for synchronously controlling switching frequency and time sequence of the light valve device and the first illumination device, wherein the switching frequency is in a range of 60 Hz to 1000 Hz and when the first illumination device turns on, the light valve device is in an opaque state; when the first illumination device turns off, the light valve device is in a transparent state.

2. The one-way vision system according to claim 1, wherein the one-way vision system is applied for an enclosed space, and the light valve device is disposed on one sidewall of the enclosed space, and the first illumination device is disposed in the enclosed space.

3. The one-way vision system according to claim 2, wherein the enclosed space comprises buildings, vehicles or exhibition cabinet.

4. The one-way vision system according to claim 1, wherein the light valve device is a polymer-dispersed liquid crystal device, a reverse mode polymer-dispersed liquid crystal device, a liquid crystal device (LCD) panel, a polarizing dimming device or a refractive dimming device.

5. The one-way vision system according to claim 1, wherein the first light source of the first illumination device is artificial light or natural light.

6. The one-way vision system according to claim 5, wherein the artificial light comprises light-emitting diode (LED), organic light emitting diode (OLED), incandescent, fluorescent cold cathode lamps, gas discharge lamps, fire type lamps or a combination thereof.

7. The one-way vision system according to claim 1, wherein the first regulating module of the first illumination device comprises an electronic adjustable module or a shutter interrupter module.

8. The one-way vision system according to claim 7, wherein the shutter interrupter module comprises a mechanical shutter or an electronic shutter.

9. The one-way vision system according to claim 1, wherein the control module is connected, to the first regulating module of the first illumination device and the light valve device by wired communication, wireless communication or power line communication.

10. The one-way vision system according to claim 1, further comprising a semi transflective layer disposed on a surface of the light valve device opposite to the side with respect to the first illumination device.

11. The one-way vision system ding to claim 10, wherein the semi transflective layer is a metal thin-film layer, a glass head layer or a high reflective porous layer.

12. The one-way vision system according to claim 1, further comprising a second illumination device disposed on a side of the light valve device opposite to the side with respect to the first illumination device, and the second illumination device comprising a second light source and a second regulating module for regulating the second illumination device, wherein the second regulating module is connected to the control module for synchronously controlling switching frequency and time sequence of the light valve device, the first illumination device and the second illumination device.

\* \* \* \* \*